United States Patent [19]
Darrow et al.

[11] Patent Number: 5,509,627
[45] Date of Patent: Apr. 23, 1996

[54] AUTOMOTIVE VEHICLE COMPONENT RETAINING ASSEMBLY

[75] Inventors: Michael B. Darrow, Northville; John L. Aleva, Livonia, both of Mich.

[73] Assignee: Ford Motor Company, Dearborn, Mich.

[21] Appl. No.: 225,104

[22] Filed: Apr. 8, 1994

[51] Int. Cl.$^6$ ............................................. G12B 9/00
[52] U.S. Cl. ............................................. 248/27.1
[58] Field of Search ................... 248/27.1, 27.3, 248/316.7, 316.8, 221.3, 221.4, 224.3; 24/290, 291, 295, 297; 403/13, 14; 439/297, 298, 354, 378

[56] References Cited

U.S. PATENT DOCUMENTS

| | | | |
|---|---|---|---|
| 2,327,329 | 8/1943 | Murphy. | |
| 2,798,271 | 7/1957 | Flora | 24/73 |
| 3,613,177 | 7/1970 | Davis. | |
| 4,006,872 | 2/1977 | Tanner | 248/27.1 |
| 4,550,944 | 11/1985 | Simon et al. | 296/70 |
| 4,572,465 | 2/1986 | Rasca | 248/27.1 |
| 4,660,789 | 4/1987 | Putnam | 248/27.3 |
| 4,668,004 | 5/1987 | Tsunoda et al. | 296/70 |
| 4,685,035 | 8/1987 | Nanjoh | 361/429 |
| 4,913,384 | 4/1990 | Inamura | 248/27.3 |
| 5,131,851 | 7/1992 | Billger et al. | 439/34 |
| 5,169,097 | 12/1992 | Yasukawa | 248/27.1 |
| 5,238,426 | 8/1993 | Arnett | 439/557 |
| 5,269,698 | 12/1993 | Singer | 439/157 |
| 5,277,623 | 1/1994 | Colleran et al. | 439/557 |
| 5,389,006 | 2/1995 | Noschese | 439/354 |
| 5,409,395 | 4/1995 | Okada | 439/354 |

*Primary Examiner*—Ramon O. Ramirez
*Attorney, Agent, or Firm*—Daniel M. Stock; Roger L. May

[57] ABSTRACT

A retaining assembly is provided for an amplifier or other component to be inserted in a compartment formed in the instrument panel of an automotive vehicle. The assembly includes at least one clip having a pair of vertically spaced latching tongues carried on resilient arms to permit snap fit engagement of the component in the compartment without substantial modification to the instrument panel. A locating pin aids in support of the component, and the assembly provides the sole vertical support.

10 Claims, 2 Drawing Sheets

1

AUTOMOTIVE VEHICLE COMPONENT RETAINING ASSEMBLY

BACKGROUND OF THE INVENTION

1. Technical Field

The present invention relates generally to automotive component mounting and more specifically to fasteners therefor.

2. Description of the Prior Art

In the manufacture of automotive vehicles, it is well known to locate components, particularly electronic components, in apertures formed in the instrument panel of the automotive vehicle. By agency of conventional fasteners, such as mounting screws, it is also known to provide a compartment or pocket within the instrument panel into which a component may be inserted for vertical support and that may be retained against lateral movement by mounting clips. U.S. Pat. Nos. 4,550,944 and 4,660,789 are exemplary of such mounting approaches.

Disadvantageously, the prior art mounting schemes generally require the cooperative design of the component to be mounted and the instrument panel and associated compartment for receiving the component. For instances in which the component to be mounted does not conform to the generally box-like compartment provided in the instrument panel, it is desirable to provide a retaining assembly which will permit mounting of the component within the compartment without any significant modifications at the adjacent instrument panel structure. The laterally spaced mounting clips of the previously mentioned exemplary patents do not overcome this disadvantage since they provide no accommodation for vertically fixing a component with respect to the instrument panel.

SUMMARY OF THE INVENTION

The disadvantages of the prior art assemblies for mounting electronic components in automotive vehicles is solved in the present invention by providing a retaining assembly that includes at least one clip fixedly secured to the component which includes vertically spaced latching tongues which engage upper and lower edges of the aperture formed through the instrument panel to define the mounting compartment.

According to one aspect of the present invention, the retaining assembly provides the sole vertical support of the component with respect to the instrument panel.

It is an object of the present invention to provide a retaining assembly for mounting a component in a compartment formed in an automotive vehicle instrument panel that fixes the component vertically with respect to the instrument panel without Substantial modification of the instrument panel itself.

BRIEF DESCRIPTION OF THE DRAWINGS

These and other objects and advantages of the present invention will be apparent to those skilled in the automotive vehicle interior arts upon reading the following description with reference to the accompanying drawings, in which.

DESCRIPTION OF THE PREFERRED EMBODIMENT

Figure 1:
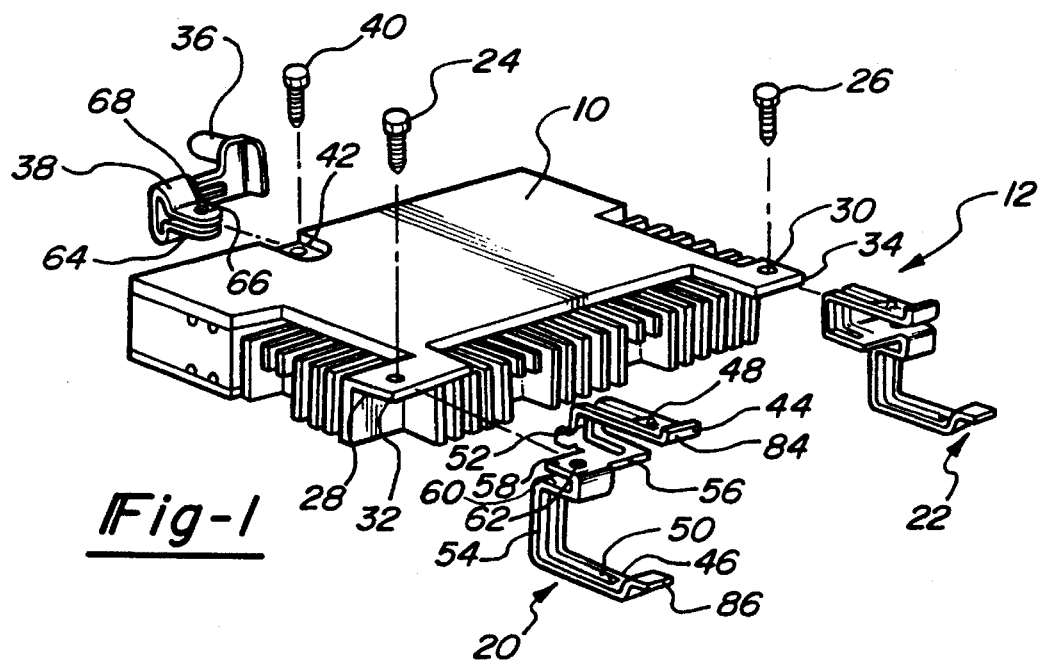
FIG. 1 is a perspective exploded view of an electronic component together with the invention retaining assembly.
Figure 2:
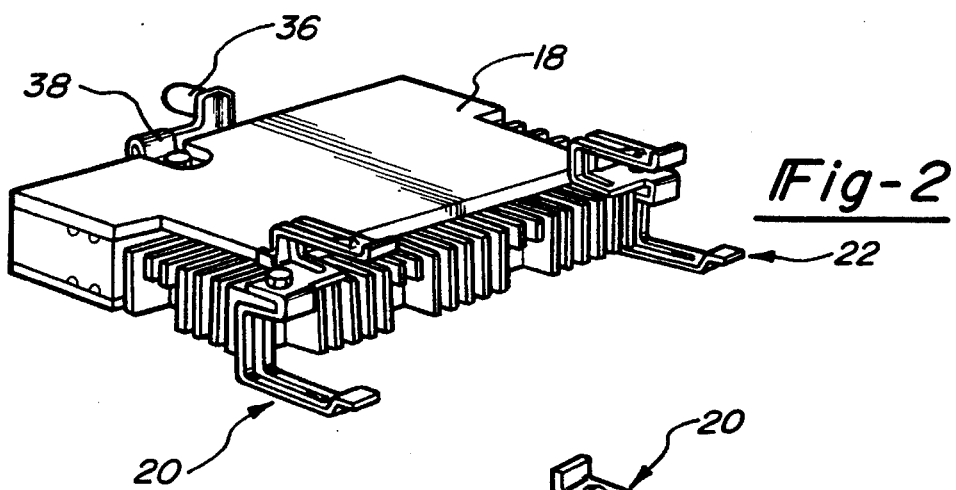
FIG. 2 is an front perspective view of the component with the retaining assembly fixed to it.
Figure 3:
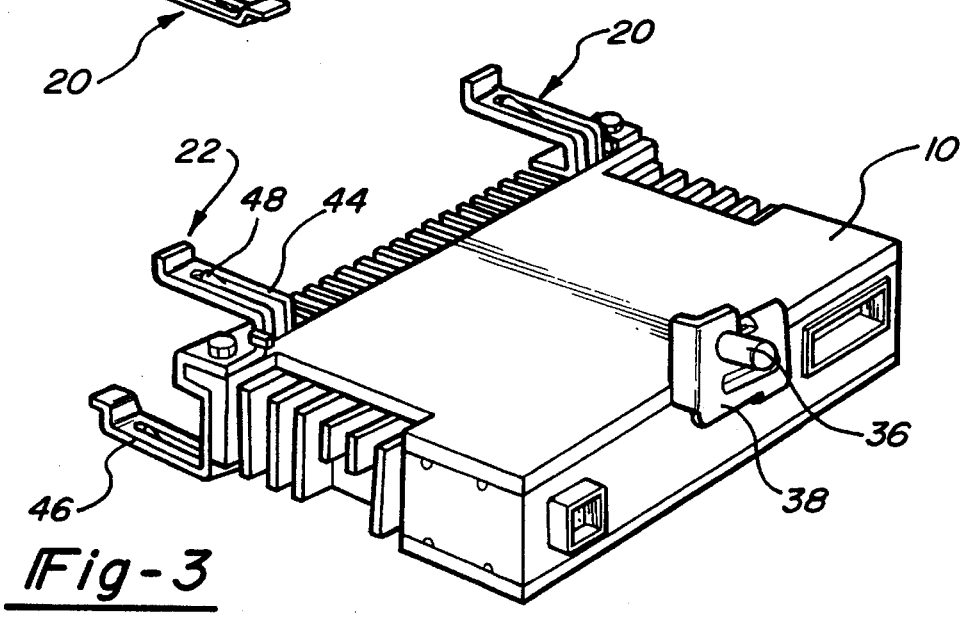
FIG. 3 is a rear perspective view of FIG. 2.
Figure 4:
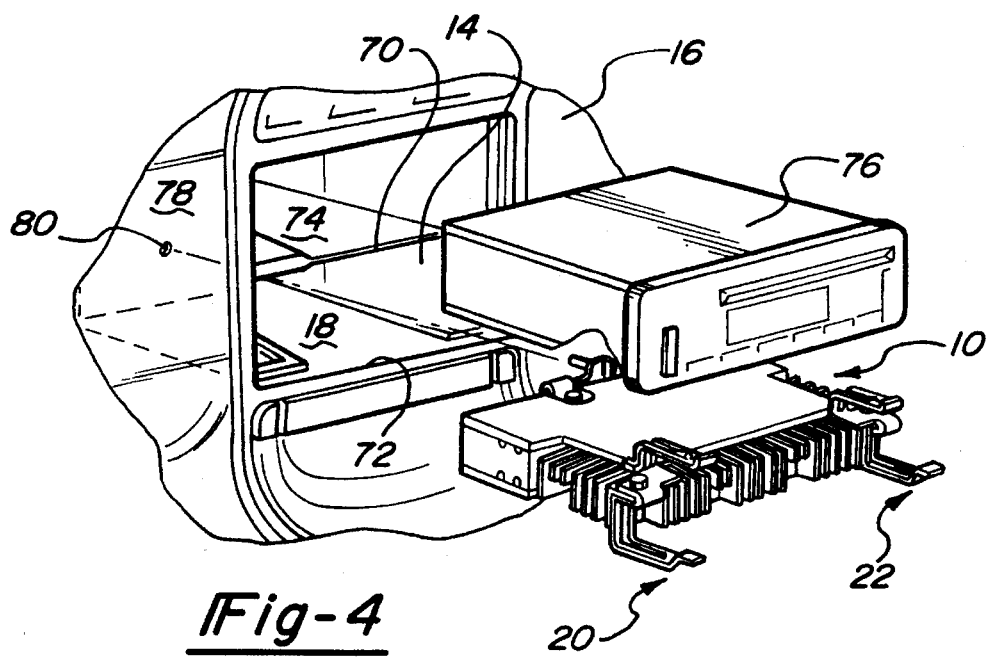
FIG. 4 is an exploded perspective view of a portion of an automotive vehicle instrument panel illustrating installation of the component with its associated retaining assembly.

Turning now to the drawings, in particular to FIGS. 1–3 thereof, an electronic component, such as an amplifier 10, is illustrated as having a generally box-like configuration and includes provision for fixed securement of a retaining assembly indicated generally at 12. When the retaining assembly 12 is secured to the amplifier 10, as shown in FIGS. 2 and 3, the amplifier 10 may be presented for insertion into an aperture 14 formed in an instrument panel 16 of an automotive vehicle as shown in FIG. 4 for communication with the generally box-like compartment, indicated generally at 18, which does not conform in size to the amplifier 10.

Returning to FIGS. 1–3, the retaining assembly 12 is illustrated as including a pair of laterally spaced clips 20, 22 which are secured as by screws 24, 26 to laterally-spaced mounting ears 28, 30 formed at the front corners 32, 34 of the amplifier 10. The retaining assembly 12 further comprises a pin 36 carried on a bracket 38 fixedly secured as by a screw 40 to a rear mounting boss 42 of the amplifier 10.

The clips 20, 22 are illustrated as being formed as mirror images and only the clip 20 will be hereafter described in detail. Those skilled in the mechanical arts will appreciate that the mirrored components of clip 22 are essentially structurally and functionally identical to those to be described with respect to the clip 20. The clip 20 includes an upper arm 44 and a lower arm 46 vertically spaced therefrom. An upper latching tongue 48 projects upwardly from the upper arm 44 and a lower latching tongue 50 projects downwardly from the lower arm 46. Each of the arms 44, 46 are configured to run longitudinally with respect to the automotive vehicle, generally normal to the aperture 14 of FIG. 4. The upper arm 44 is resiliently supported in cantilever fashion by a vertically extending positioning wall 52 and the lower arm 46 is similarly supported by a second vertically extending positioning arm 54. The first vertical positioning arm 52 terminates in a longitudinally extending plate 56 as does the second vertically extending arm 54. A turned-over portion 58 forms a slot 60 for receiving the mounting ear 28. An aperture 62 is formed through the turned-over portion 58 for receiving the screw 24.

The bracket 38 includes a clamp portion 64, having a tab 66, pierced by an aperture 68 for receiving the screw 40 to clampingly secure the bracket 38 and hence the locating pin 36 to the mounting boss 42 of the amplifier 10.

Figure 5:
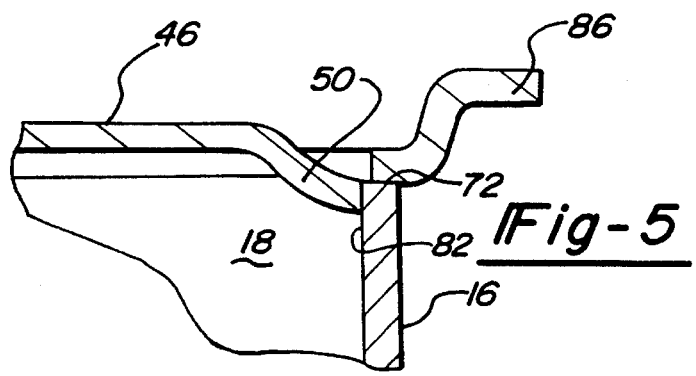
FIG. 5 is an enlarged cross-sectional view of an edge of the aperture into which the component is inserted.
Figure 6:
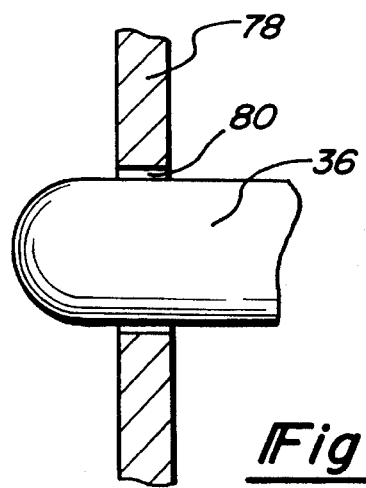
FIG. 6 is an enlarged cross-sectional view of an inner portion of the compartment of the instrument panel.

The simple efficacy of mounting the amplifier 10 through agency of the retaining assembly 12 may best be appreciated by reference to FIGS. 4–6. The aperture 14 through the instrument panel 16 and to compartment 18 is bounded by an upper edge 70 and a lower edge 72. Another compartment 74 above it may be configured to receive another electronic component such as a radio 76. A back wall 78 of the instrument panel 16 may include a locating aperture 80. It is to be understood, however, that the locating aperture 80 may be provided as an appendage to the radio 76 in applications in which secure provision has been made for mounting and fixedly securing the radio 76 with respect to the instrument panel 16.

Upon insertion of the amplifier 10 into the compartment 18, as may best be seen in FIG. 5, the spacing between the vertical boundaries of the upper arm 44 and the lower arm 46 is approximately equal to the vertical spacing between the upper and lower edges 70, 72 of the aperture 14. Insertion of the amplifier 10 through the aperture 14 results therefore in inward flexing of the arms 44, 46 as the latching tongues 48, 50 engage upper and lower edges 70, 72, respectively. After full insertion, the tongues snap into place within the aperture 14 as behind the inner face 82 of the instrument panel 16 adjacent the lower edge 72, as shown in FIG. 5. Further inward movement of the amplifier 10 may be prevented by proper positioning of upturned stop tabs 84 on the clips 20, 22. Compression of the upper stop tab 84 and out-turned lower removal tab 86 will permit release and outward removal of the amplifier 10 with respect to the instrument panel 16. Upon full insertion of the amplifier 10 with respect to the compartment 18, the vertical placement of the amplifier 10 with respect to the instrument panel 16 is set by the clips 20, 22, as shown. Insertion of the pin 36 through the aperture 80 stabilizes the support and is operative to resist lateral movement.

While only one embodiment of the invention retaining assembly has been shown and described, others may be possible without departing from the scope of the appended claims.

What is claimed is:

1. A retaining assembly for mounting a component in a compartment formed in an automotive vehicle instrument panel upon insertion through an aperture having an upper edge and a lower edge, the retaining assembly comprising:

at least one clip fixedly securable to the component and having a pair of vertically spaced latching tongues, one latchingly engageable with the aperture upper edge and the other latchingly engageable with the aperture lower edge in snap-fit relationship upon insertion of the component through the aperture into the compartment; and a locating pin fixedly securable to the component adapted to be received by a portion of the vehicle instrument panel within the compartment.

2. A retaining assembly as defined in claim 1, wherein the at least one clip comprises a pair of clips laterally spaced with respect to the aperture.

3. A retaining assembly as defined in claim 1, wherein each latching tongue is carried by a resilient arm extending longitudinally with respect to the instrument panel.

4. A retaining assembly as defined in claim 2, wherein each latching tongue is carried by a resilient arm extending longitudinally with respect to the instrument panel.

5. A retaining assembly for mounting a component in a compartment formed in an automotive vehicle instrument panel upon insertion through an aperture having an upper edge and a lower edge, the retaining assembly comprising:

at least one clip fixedly securable to the component and having a pair of vertically spaced latching tongues, one latchingly engageable with the aperture upper edge and the other latchingly engageable with the aperture lower edge in snap-fit relationship upon insertion of the component through the aperture into the compartment; and a locating pin fixedly securable to the component adapted to be received by a portion of the vehicle instrument panel within the compartment, the retaining assembly effecting the sole supporting connection between the component and the instrument panel.

6. A retaining assembly as defined in claim 5, wherein the at least one clip comprises a pair of clips laterally spaced with respect to the aperture.

7. A retaining assembly as defined in claim 5, wherein each latching tongue is carried by a resilient arm extending longitudinally with respect to the instrument panel.

8. A retaining assembly as defined in claim 6, wherein each latching tongue is carried by a resilient arm extending longitudinally with respect to the instrument panel.

9. A retaining assembly for mounting a component in a compartment formed in an automotive vehicle instrument panel upon insertion through an aperture having an upper edge and a lower edge, the retaining assembly comprising:

a pair of clips laterally spaced with respect to the aperture;

a locating pin fixedly securable to the component and adapted to be received by a portion of the vehicle instrument panel within the compartment, whereby the retaining assembly effects vertical support between the instrument panel and the component.

10. A retaining assembly as defined in claim 9, wherein the retaining assembly is interposable between the component and the instrument panel to maintain spacing therebetween.

* * * * *